(12) United States Patent
Anand et al.

(10) Patent No.: US 11,144,183 B2
(45) Date of Patent: Oct. 12, 2021

(54) SYSTEM AND METHOD FOR PREVIEWING A DASHBOARD DISPLAY ON VARIOUS FORM FACTORS

(71) Applicant: Rockwell Automation Technologies, Inc., Mayfield Heights, OH (US)

(72) Inventors: Ashish Anand, Mayfield Heights, OH (US); Damon Purvis, Corona, CA (US); Zdenek Kodejs, Prague (CZ); Vojtech Sipek, Mělník (CZ)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 111 days.

(21) Appl. No.: 15/278,324

(22) Filed: Sep. 28, 2016

(65) Prior Publication Data

US 2018/0088783 A1 Mar. 29, 2018

(51) Int. Cl.
*G06F 3/0484* (2013.01)
*G06F 9/451* (2018.01)

(52) U.S. Cl.
CPC .......... *G06F 3/04845* (2013.01); *G06F 9/451* (2018.02); *Y02P 90/02* (2015.11)

(58) Field of Classification Search
CPC ............................ G06F 3/04845; G06F 3/0482
See application file for complete search history.

(56) References Cited

U.S. PATENT DOCUMENTS

| | | | | |
|---|---|---|---|---|
| 5,796,401 A | * | 8/1998 | Winer | G06T 11/60 345/619 |
| 6,825,860 B1 | * | 11/2004 | Hu | G06F 3/0481 345/660 |
| 2006/0277479 A1 | * | 12/2006 | Britt | H04L 29/0899 715/760 |
| 2008/0109740 A1 | * | 5/2008 | Prinsen | G06F 3/0486 715/764 |
| 2015/0020010 A1 | * | 1/2015 | Hale | G06F 9/4443 715/765 |
| 2016/0170610 A1 | * | 6/2016 | Bertram | G06Q 10/10 715/845 |
| 2016/0179359 A1 | * | 6/2016 | Kodejs | G06F 3/04817 715/763 |
| 2017/0139404 A1 | * | 5/2017 | Anand | G05B 19/4155 |

* cited by examiner

*Primary Examiner* — William L Bashore
*Assistant Examiner* — Gregory A DiStefano

(57) ABSTRACT

Provided herein are systems, methods, and software for previewing a dashboard report comprising displaying a graphical object on a dashboard design canvas of a design graphical user interface (GUI), receiving a user input to display a preview GUI of the dashboard design canvas, and displaying a preview of the dashboard design canvas on the preview GUI according to a preview mode. The preview mode is user-selectable and includes a monitor device preview mode that causes the preview GUI to display the preview of the dashboard design canvas as the dashboard design canvas would appear when viewed on a monitor device having a screen resolution greater than a monitor threshold and an alternate device preview mode causes the preview GUI to display the preview of the dashboard design canvas as the dashboard design canvas would appear when viewed on a preview device having a screen resolution less than the monitor threshold.

20 Claims, 14 Drawing Sheets

SYSTEM AND METHOD FOR PREVIEWING A DASHBOARD DISPLAY ON VARIOUS FORM FACTORS

TECHNICAL FIELD

Aspects of the disclosure are related to computing hardware and software technology, and in particular to industrial automation applications.

TECHNICAL BACKGROUND

Industrial controllers and their associated I/O devices are central to the operation of modern automation systems. These controllers interact with field devices on the plant floor to control automated processes relating to such objectives as product manufacture, material handling, batch processing, supervisory control, and other such applications. Industrial controllers store and execute user-defined control programs to effect decision-making in connection with the controlled process. Such programs can include, but are not limited to, ladder logic, sequential function charts, function block diagrams, structured text, or other such programming structures.

Because of the large number of system variables that must be monitored and controlled in near real-time, industrial automation systems often generate vast amounts of near real-time data. In addition to production statistics, data relating to machine health, alarm statuses, operator feedback (e.g., manually entered reason codes associated with a downtime condition), electrical or mechanical load over time, and the like are often monitored, and in some cases recorded, on a continuous basis. This data is generated by the many industrial devices that can make up a given automation system, including the industrial controller and its associated I/O, telemetry devices for near real-time metering, motion control devices (e.g., drives for controlling the motors that make up a motion system), visualization applications, lot traceability systems (e.g., barcode tracking), etc. Moreover, since many industrial facilities operate on a 24-hour basis, their associated automation systems can generate a vast amount of potentially useful data at high rates. For an enterprise with multiple plant facilities, the amount of generated automation data further increases.

The large quantity of data generated by modern automation systems makes it possible to apply a broad range of plant analytics to the automation systems and processes that make up an industrial enterprise or business. Graphical views of the data such as by dashboards, reports, charts, and other human-readable formats are often available or may be created for plant personnel and others wishing to monitor and review the generated data in either a real-time mode or at a later time after the data has been stored.

Graphical design software used by graphics designers to create visual displays of the automation data provides a workspace to place and modify graphics to show the desired data in a dashboard or report, for example. Once published into an accessible file, the dashboard or report can be viewed in software designed to render the published file using a variety of devices. Viewing devices can include monitors, tablets, smartphones, and other electrical components having a display capable of displaying the dashboard/report. Due to the variety of display sizes, the viewing software may render the graphic objects differently based on how the data should be presented on a physically small screen versus a physically large screen. Existing graphical design software, however, lacks the ability to show the designer how the different screen renderings would look on different screen sizes.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

OVERVIEW

Provided herein are systems, methods, and software for previewing a dashboard report. In one implementation, a method for previewing a dashboard report comprises displaying a graphical object in a display cell on a dashboard design canvas of a design graphical user interface (GUI), the display cell positionable about the dashboard design canvas by a user. The method also comprises receiving a user input to display a preview GUI of the dashboard design canvas and displaying a preview of the dashboard design canvas on the preview GUI according to a preview mode, wherein the preview mode is user-selectable from a plurality of preview modes comprising a monitor device preview mode and an alternate device preview mode. The monitor device preview mode causes the preview GUI to display the preview of the dashboard design canvas as the dashboard design canvas would appear when viewed on a monitor device having a screen resolution greater than a monitor threshold, and the alternate device preview mode causes the preview GUI to display the preview of the dashboard design canvas as the dashboard design canvas would appear when viewed on a preview device having a screen resolution less than the monitor threshold.

In another implementation, a computer-readable storage medium, not including a signal, having computer-executable instructions for previewing a dashboard report, the instructions executing on a processor of a computer, comprising displaying a graphical object in a display cell on a dashboard design canvas of a design graphical user interface (GUI), the display cell positionable about the dashboard design canvas by a user. The instructions also comprise receiving a user input to display a preview GUI of the dashboard design canvas and displaying a preview of the dashboard design canvas on the preview GUI according to a preview mode, wherein the preview mode is user-selectable from a plurality of preview modes comprising a monitor device preview mode and a handheld device preview mode. The monitor device preview mode causes the preview GUI to display the preview of the dashboard design canvas as the dashboard design canvas would appear when viewed on a monitor device having a screen resolution greater than a monitor threshold. The handheld device preview mode causes the preview GUI to display the preview of the dashboard design canvas as the dashboard design canvas would appear when viewed on a handheld preview device having a screen resolution less than the monitor threshold.

In another implementation, a system includes a processor and a computer-readable medium, an operating environment stored on the computer-readable medium and executing on the processor, a display for displaying a document and a spin control. A visual manager operating on the processor is included and configured to perform tasks comprising receiving a user input to display a preview GUI of the dashboard design canvas and displaying a preview of the dashboard design canvas on the preview GUI according to a preview mode, wherein the preview mode is user-selectable from a plurality of preview modes comprising a monitor device preview mode, a tablet device preview mode, and a phone device preview mode. The monitor device preview mode causes the preview GUI to display the preview of the dashboard design canvas as the dashboard design canvas would appear when viewed on a monitor device having a screen resolution greater than a monitor threshold. The tablet device preview mode causes the preview GUI to display the preview of the dashboard design canvas as the dashboard design canvas would appear when viewed on a tablet device having a screen resolution less than the monitor threshold and greater than a tablet threshold. The phone device preview mode causes the preview GUI to display the preview of the dashboard design canvas as the dashboard design canvas would appear when viewed on a phone device having a screen resolution less than the tablet threshold.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Implementations described herein provide for previewing how a dashboard report will appear on multiple target viewing devices from within the design software configured to allow the dashboard report to be created and modified. In this manner, the designer may view and alter, if necessary, how the dashboard and dashboard graphical objects will appear on viewing devices different than the viewing device used to design the dashboard.

Figure 1:
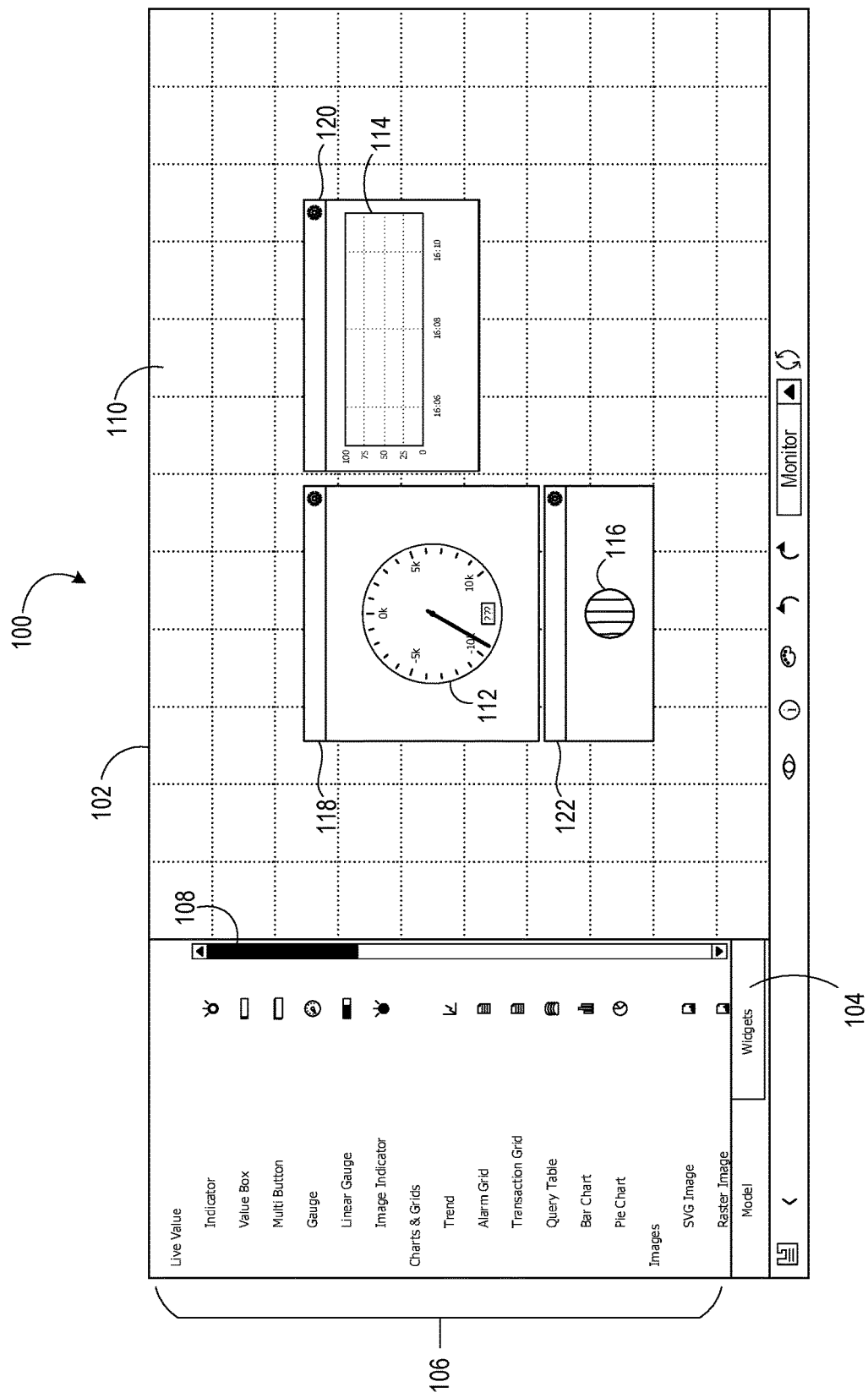
FIG. 1 illustrates a graphical user interface of a dashboard design application in an exemplary implementation.

FIG. 1 illustrates a graphical user interface (GUI) 100 of graphical design software useful in creating a visual display of automation data in an exemplary implementation. GUI 100 includes a workspace pane 102 in which to place and position graphical objects and a widget pane 104 containing a list of widgets 106 available for selection and placement in workspace pane 102. As used herein, a widget is a graphical object configured to render or display a parameter or data value assigned thereto in a graphical format. Widgets may show the data in graphical charts, indicators, graphs, tables, images, gauges, or the like. A portion of the available widgets 106 is illustrated in FIG. 1 as evidenced by the vertical scrollbar 108 in widget pane 104.

Workspace pane 102 provides a design canvas or workspace 110 in which the designer may place and position various widgets 106 to present real-time or stored data from an industrial automation system or other type of system. As illustrated in FIG. 1 a gauge widget 112, a trend widget 114, and an indicator widget 116 have been placed onto workspace 110. Placement of widgets 106 onto workspace 110 may be accomplished via a drag-and-drop operation from widget pane 104 to workspace 110, for example. Other types of procedures for placing widgets 106 onto workspace 110 may include menu-driven operations, double-click operations, etc.

The placement of a widget 106 onto workspace 110 causes the creation of a display cell 118, 120, 122 in which each type of widget is placed. As shown in FIG. 1, widgets 112-116 are each created in respective display cells 118-122. The responsibilities of the display cells 118-122 include creating a container on workspace 110 in which position and size parameters may be manipulated according to the desired design of the dashboard and creating one or more widgets in the container for showing the desired model data. Each display cell 118-122 is preferably created for only a single type of widget 106 to be shown therein, although multiple display cells may be created on workspace 110 for the same type of widget 106. For example, while FIG. 1 illustrates three display cells 118-122 for respective types of widget 106 (e.g., gauge widget 112, trend widget 114, and indicator widget 116), a designer could position another display cell containing a gauge widget below display cell 122 or elsewhere on workspace 110 if desired. With the collection of widgets 112-116 and display cells 118-122, workspace 110 forms a display showing the desired dashboard, report, or other type of graphical output desired to be shown to and used by a user to view what data is being captured in the system.

In one embodiment, when created on workspace 110, each display cell 118-122 represents a generic or base-type of widget that is not yet tied to any data model. For instance, widgets 112-116 shown in display cells 118-122 on workspace 110 of FIG. 1 show the graphics representative of their respective type of widget, but they are not yet tied to a model to be able to show a graphical representation of the particular data value of the model. In this embodiment, widgets 106 are placed first, followed by assignment of model data to each widget thereafter. This allows for one type of widget to be used multiple times to show different data points from the model. In an alternative embodiment, the model may be selected first, followed by placement of widgets 106 onto workspace 110 that are tied to the specific model.

Figure 2:
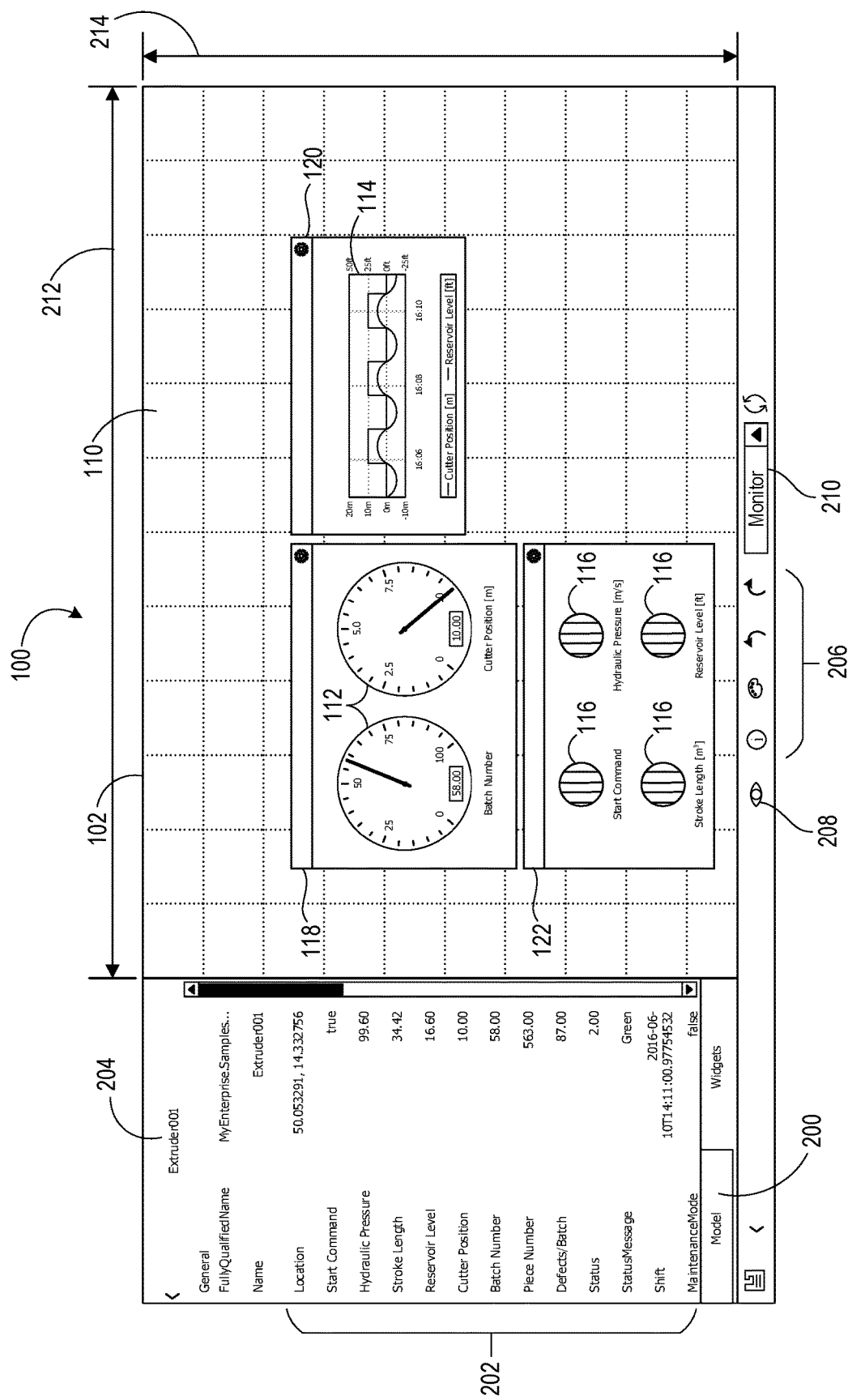
FIG. 2 illustrates a graphical user interface of a dashboard design application in an exemplary implementation.

Referring to FIG. 2, GUI 100 shows a model pane 200 containing model template tags 202 of a model object 204 (e.g., Extruder001) belonging to a system that is desired to be monitored. Model template tags 202 represent properties of model object 204 that contain data able to be tied to display cells 118-122 to show the data graphically. The model template tags 202 and their data values may be acquired from a database system (see database system 408 of FIG. 14) or directly from a machine (see machine system 404 of FIG. 14) in one or more embodiments.

To associate or tie data from model template tags 202 to the type of widget desired to show the data, the desired model template tag 202 may be moved via a drag-and-drop operation from model pane 200 to the respective display cell 118-122, for example. Other types of procedures for placing widgets 106 onto workspace 110 may include menu-driven operations, double-click operations, etc. As illustrated in FIG. 2, the batch number and cutter position tags 202 have been tied to gauge widgets 112. The batch number tag 202 has also been tied to trend widget 114 to graphically show the data in a different format. The reservoir level tag 202 has been tied to both trend widget 114 and to an indicator widget 116, and the start command, hydraulic pressure, and stroke length tags 202 have also been tied to a respective indicator widget 116.

Display cells 118-122 automatically re-position and re-size their respective widgets 106 as tags 202 are added thereto or removed therefrom. In addition, the designer can re-position one or more widgets 106 within a respective display cell 118-122 if the display cell 118-122 positions a widget 106 in an undesirable location. The automatic re-positioning and re-sizing is based on the size of the display cell 118-122 on the workspace 110 in one embodiment. Thus, widgets 106 are re-sized to be smaller if necessary when a new tag 202 is added so that all added tags 202 may be shown in the display cell 118-122. The designer may also re-position and re-size display cells 118-122 on workspace 110 change the look and position of widgets 106 if desired.

GUI 100 includes a plurality of tools 206 configured to help the designer manipulate or get information from items placed on workspace 110. In one example, the tools allow the designer to get information about a selected item, to manipulate the item's color palette, and to rotate the item if desired.

In addition, a preview tool 208 is offered to allow the designer to see how the designed dashboard will appear on different devices. After the dashboard is published into an accessible file, the dashboard or report can be viewed in reporting software (e.g., such as an Internet browser plug-on) designed to render the published file using a variety of devices. The reporting software used to view the published dashboard may be configured to render the display cells 118-122 differently depending on the size and/or resolution of the viewing device. However, to allow the designer to view how the dashboard will appear in the variety of devices without being required to publish the dashboard and open the published file on each of the intended viewing devices, preview tool 208 allows the designer to view in the design software how the dashboard will look to the various devices once published.

When using a viewing device such as a monitor having a resolution greater than or equal to a first threshold ("monitor threshold") to view the published dashboard, the reporting software is generally configured to proportionally display the dashboard as designed. For example, if the dashboard was designed on a workspace 110 having dimensions of 1280×1024 pixels and if the dashboard is viewed on a monitor having the same 1280×1024 pixel resolution, the reporting software is configured to display the dashboard as designed. When the dashboard is viewed on a monitor having different height and/or width resolutions than the resolution of the designed workspace 110, the reporting software stretches the dashboard to fit the different monitor size. For example, if the viewing monitor has a width that is one and a half times the size of the designed dashboard width, the reporting software will stretch the dashboard one and a half times to fit the viewing monitor screen.

Figure 3:
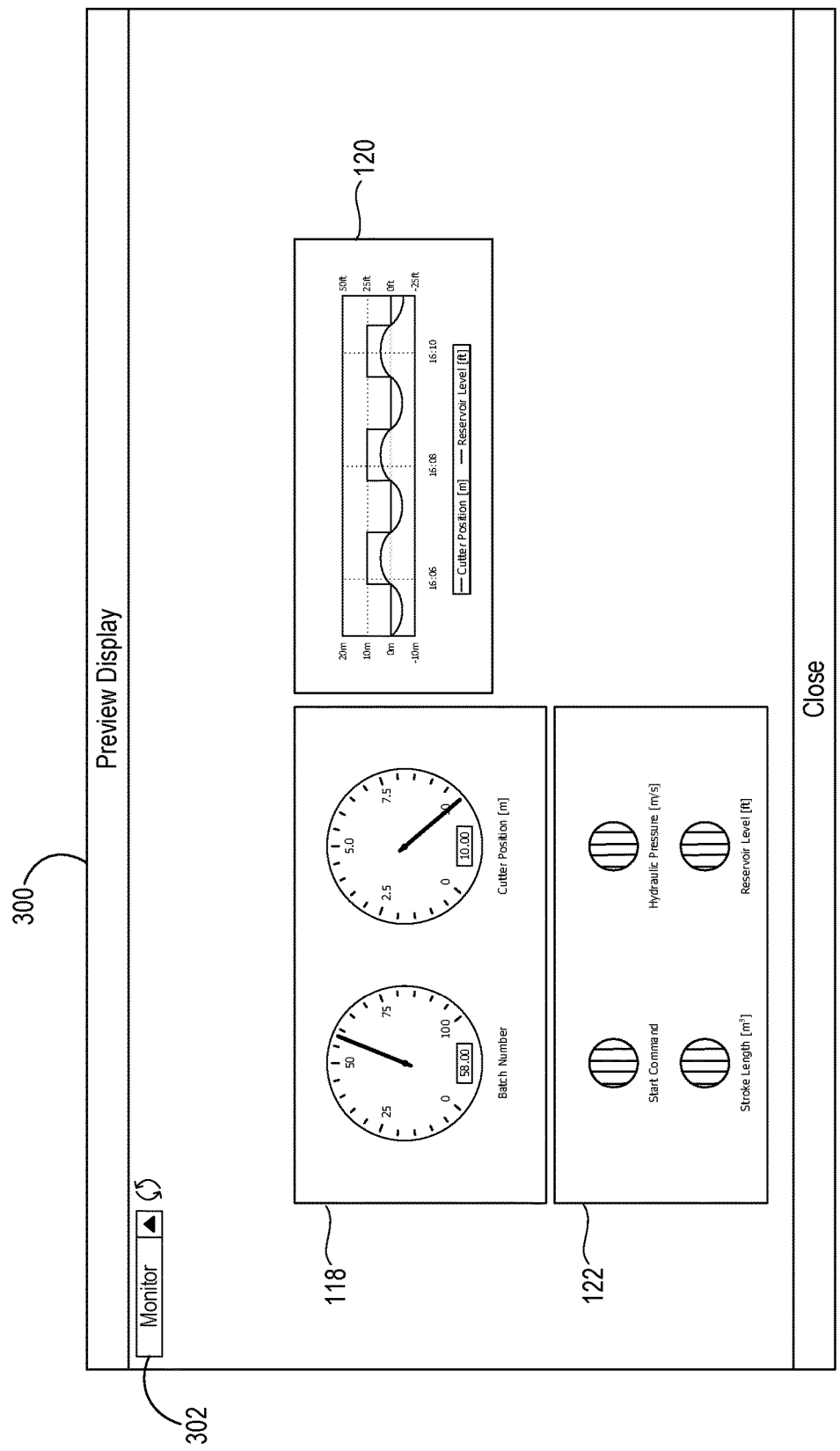
FIG. 3 illustrates a graphical user interface preview display of a dashboard design application in an exemplary implementation.

FIG. 3 illustrates a GUI 300 displayable by the design software to allow the designer to see how the designed dashboard will appear on a target viewing device. A target viewing device selector 302 allows the user/designer to set the type of device intended to render and display the published dashboard. Target viewing device selector 302 contains a plurality of preview modes including a monitor mode and one or more handheld device preview modes. The one or more handheld device preview modes may include, for example, a tablet device preview mode and a phone device preview mode. As illustrated in FIG. 3, a monitor is selected as the target viewing device. The indication of the monitor as the target viewing device causes the GUI 300 to display the dashboard according to the rules determined for devices having a resolution greater than or equal to the monitor threshold. As an example, GUI 300 is wider than workspace 110; thus, the displayed dashboard in GUI 300 stretches the dashboard accordingly. In this example, display cells 118-122 are re-positioned and stretched in the width direction according to the viewing monitor resolution parameters in order to fit the dashboard to the viewing monitor screen.

In one embodiment, the resolution parameters of the target viewing monitor may be determined by a height and width of GUI 300. For example, changing either or both of a height and a width of GUI 300 may cause GUI 300 to re-position and re-size display cells 118-122 according to the proportion of the height/width parameters of GUI 300.

Figure 4:
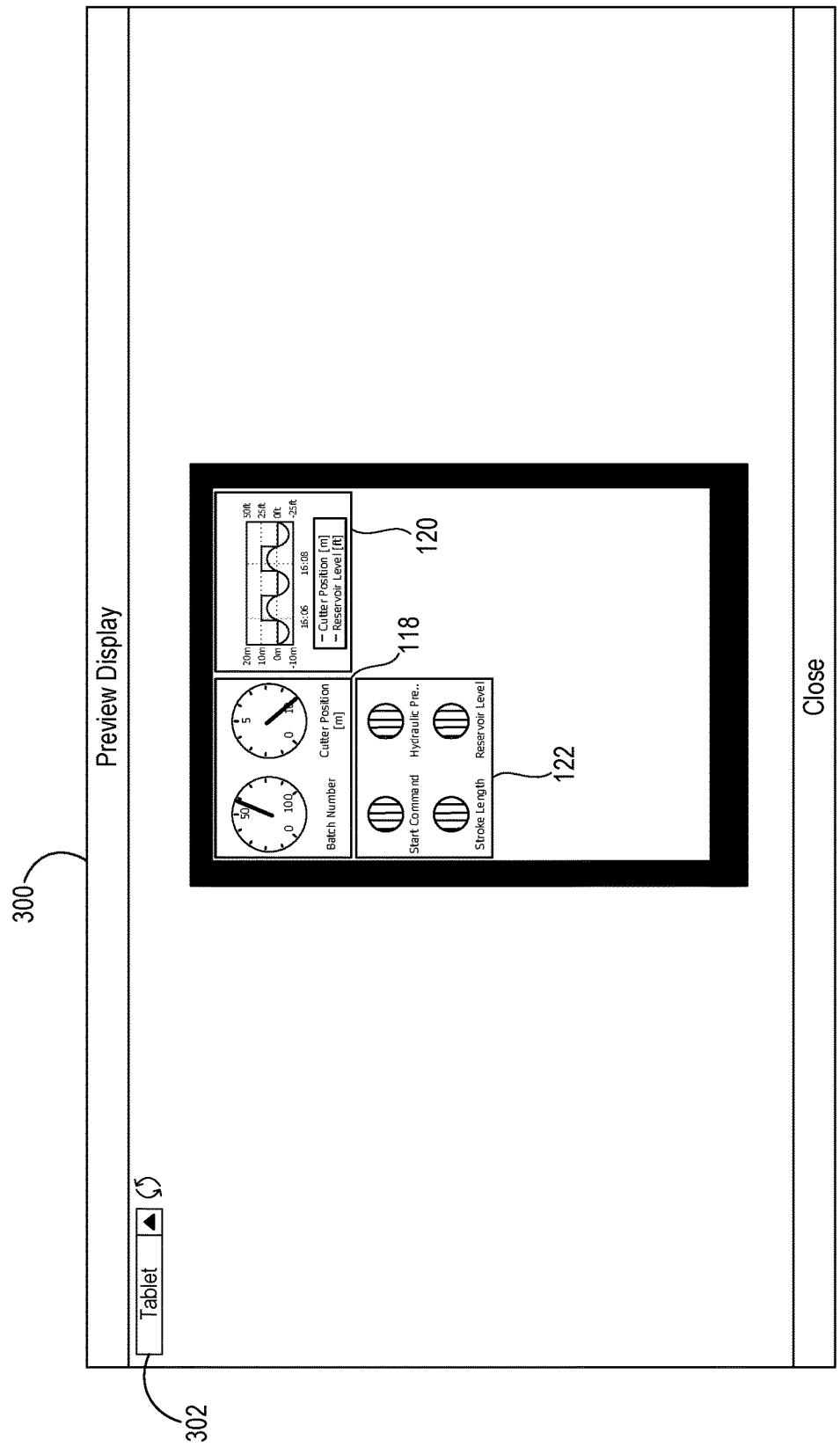
FIG. 4 illustrates a graphical user interface preview display of a dashboard design application in an exemplary implementation.

As illustrated in FIG. 4, when target viewing device selector 302 is set to a tablet mode, GUI 300 displays the dashboard as it would appear on a target viewing device having a resolution less than the monitor threshold but greater than or equal to a second threshold ("tablet threshold"). When using a viewing device such as a tablet having a resolution between the tablet and monitor thresholds to view the published dashboard, the reporting software is generally configured to re-position and re-size the display cells 118-122 for easier viewing on the smaller sized screen of the tablet. In the tablet mode, the reporting software may be configured to display the dashboard as a two-column arrangement. In this arrangement, display cells 118-122 are re-sized to fit within one of the columns and re-positioned to a particular column based on the respective locations in the original designed dashboard layout. For example, display cells 118-122 may be arranged from the original layout according to a left-to-right/top-to-bottom arrangement.

Figure 5:
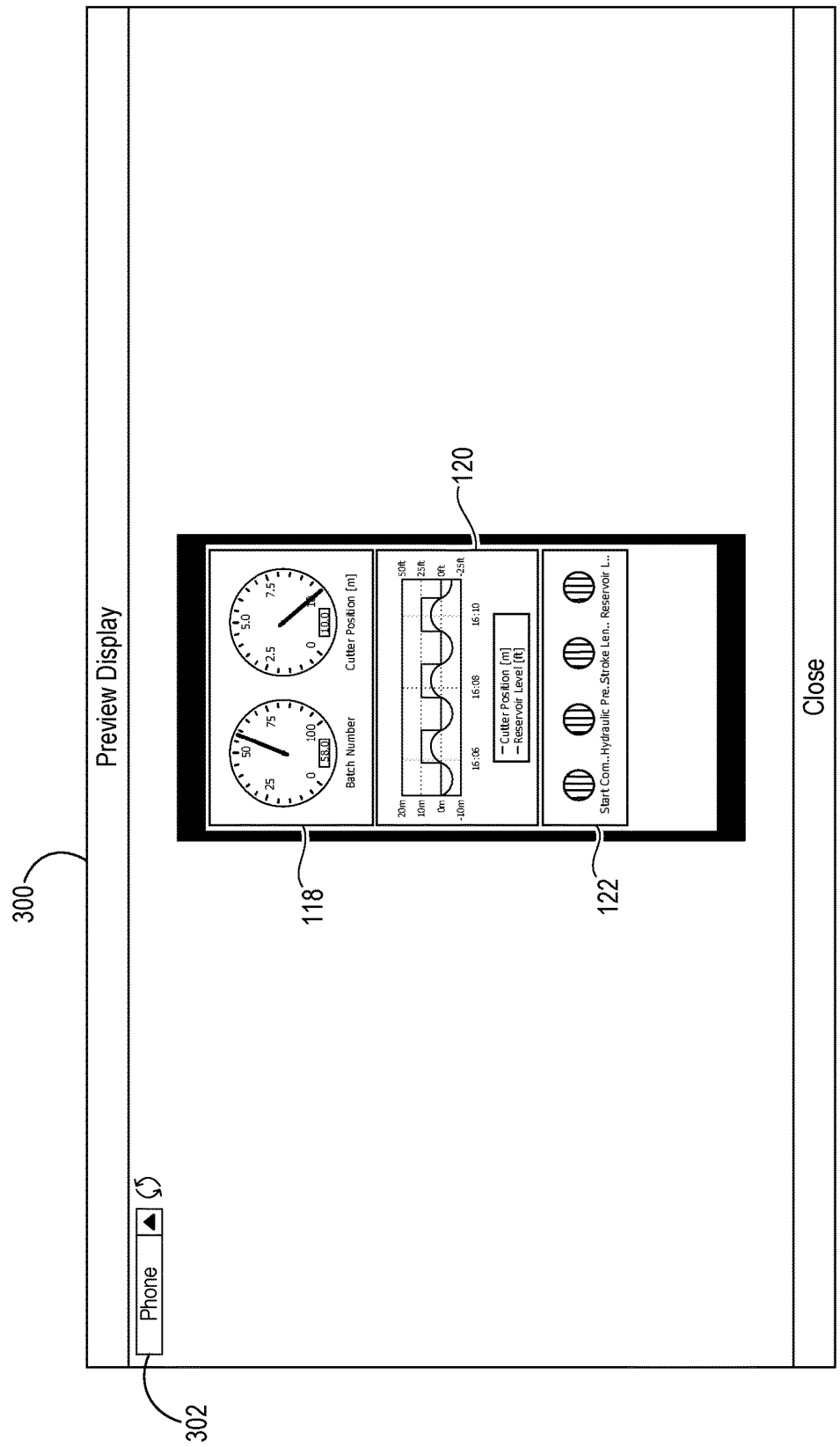
FIG. 5 illustrates a graphical user interface preview display of a dashboard design application in an exemplary implementation.

As illustrated in FIG. 5, when target viewing device selector 302 is set to a phone mode, GUI 300 displays the dashboard as it would appear on a target viewing device having a resolution less than the tablet threshold ("phone threshold"). When using a viewing device such as a phone having a resolution less than the tablet threshold to view the published dashboard, the reporting software is generally configured to re-position and re-size the display cells 118-122 for easier viewing on the smaller sized screen of the phone. In the phone mode, the reporting software may be configured to display the dashboard as a single-column arrangement. In this arrangement, display cells 118-122 are re-sized to fit within one column and re-positioned to the single column based on the respective locations in the original designed dashboard layout. For example, display cells 118-122 may be arranged from the original layout according to a left-to-right/top-to-bottom arrangement.

Figure 6:
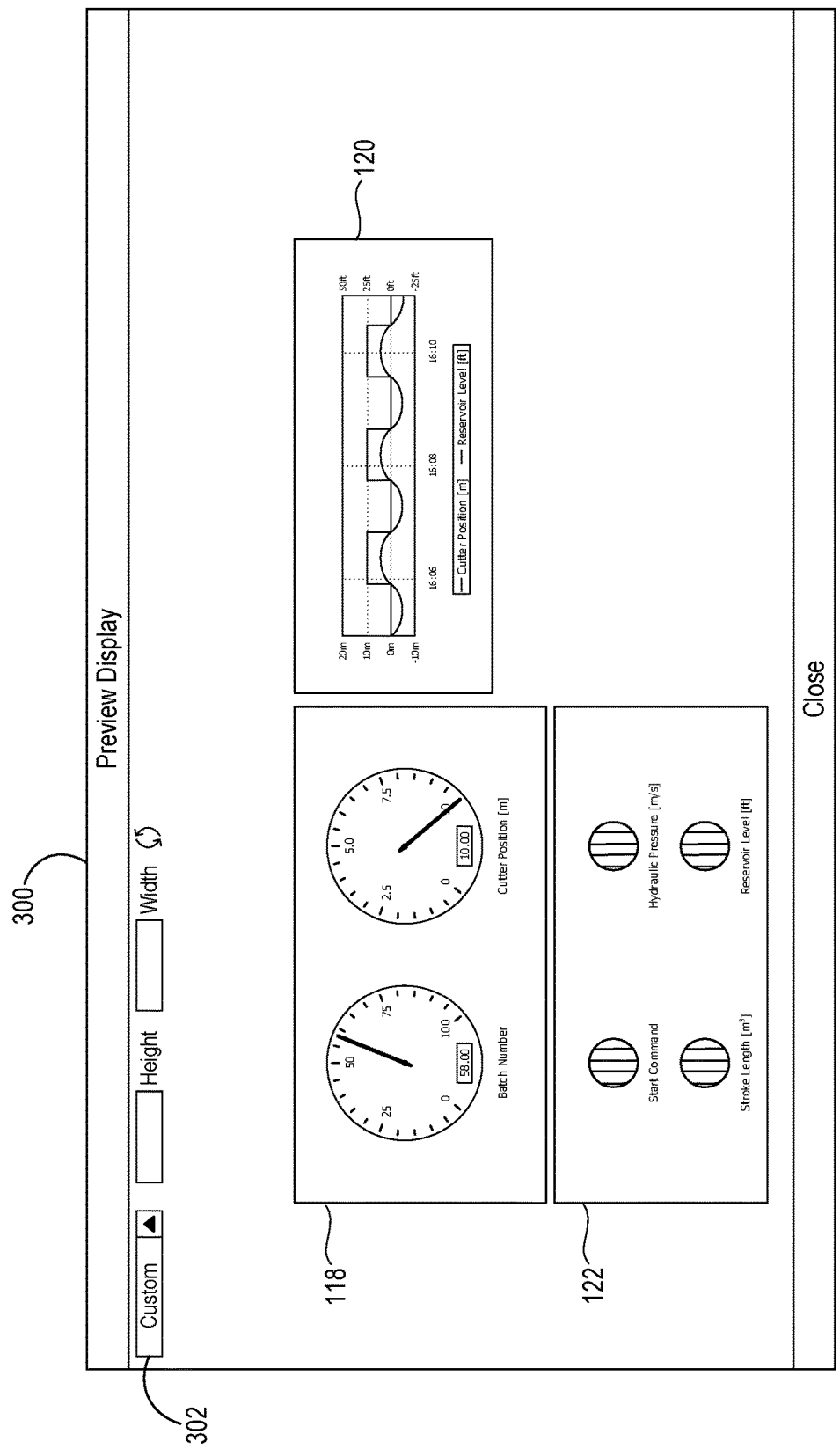
FIG. 6 illustrates a graphical user interface preview display of a dashboard design application in an exemplary implementation.

In another embodiment as illustrated in FIG. 6, target viewing device selector 302 allows for selection of a custom target viewing device where the height and width resolution parameters may be entered by a keyboard or other input device to be a fixed number not dependent on the size of GUI 300. In one embodiment, the monitor, tablet, and phone thresholds are determined by a width of the viewing device in pixels. Accordingly, when setting the width parameter of the custom-sized preview device in FIG. 6, setting the width parameter to a width greater than the monitor threshold will cause GUI 300 to display the dashboard according to the monitor preview rules described above. However, setting the width parameter to a width within the tablet threshold range will cause GUI 300 to display the dashboard according to the tablet preview rules described above. Similarly, setting the width parameter to a width within the phone threshold range will cause GUI 300 to display the dashboard according to the phone preview rules described above. As such, the custom preview selection displayed in FIG. 6 may be used to preview the dashboard according to any of the target device preview rules without further changing target viewing device selector 302.

The monitor, tablet, and phone thresholds may be determined based on the screen size reported by the target device rather than the actual hardware-based screen size of the target device. Due to advances in technology, latest-generation tablets and phones may incorporate a larger resolution screen than earlier-model monitors. However, the physical dimensions of the earlier-model monitors are typically still larger than the smaller tablet and phone devices. Accordingly, many tablets and phones have built-in functionality to report a lower screen resolution to software such as, for example, a Web-based plug-in than the actual screen resolution of the device hardware. In this manner, the tablet or phone devices do not display images or text that are too small to be easily perceived. These lower-reported screen resolutions may be used to determine the monitor, tablet, and phone thresholds. The threshold values may be predetermined in the design software based on the various reported screen resolutions and may be modified by the designer to other desired values.

Returning again to FIG. 2, in addition to displaying a preview GUI (e.g., GUI 300) when preview tool 208 is activated, GUI 100 further allows the dashboard designer to design the dashboard using predetermined resolution parameters of the workspace 110 or using custom parameters by selection of the workspace dimensions via a workspace selector 210. As illustrated in FIG. 2, workspace selector 210 is set to a monitor selection, filling the entire workspace pane 102 with a monitor design canvas on which to place widgets 106 for creating display cells 118-122. In one example, whenever the monitor selection is used, the entire workspace pane 102 has a width pixel dimension 212 of 1280 pixels and a height pixel dimension 214 of 1024 pixels. However, the full workspace pane 102 may have different default values for the height and width dimensions in other embodiments.

Figure 7:
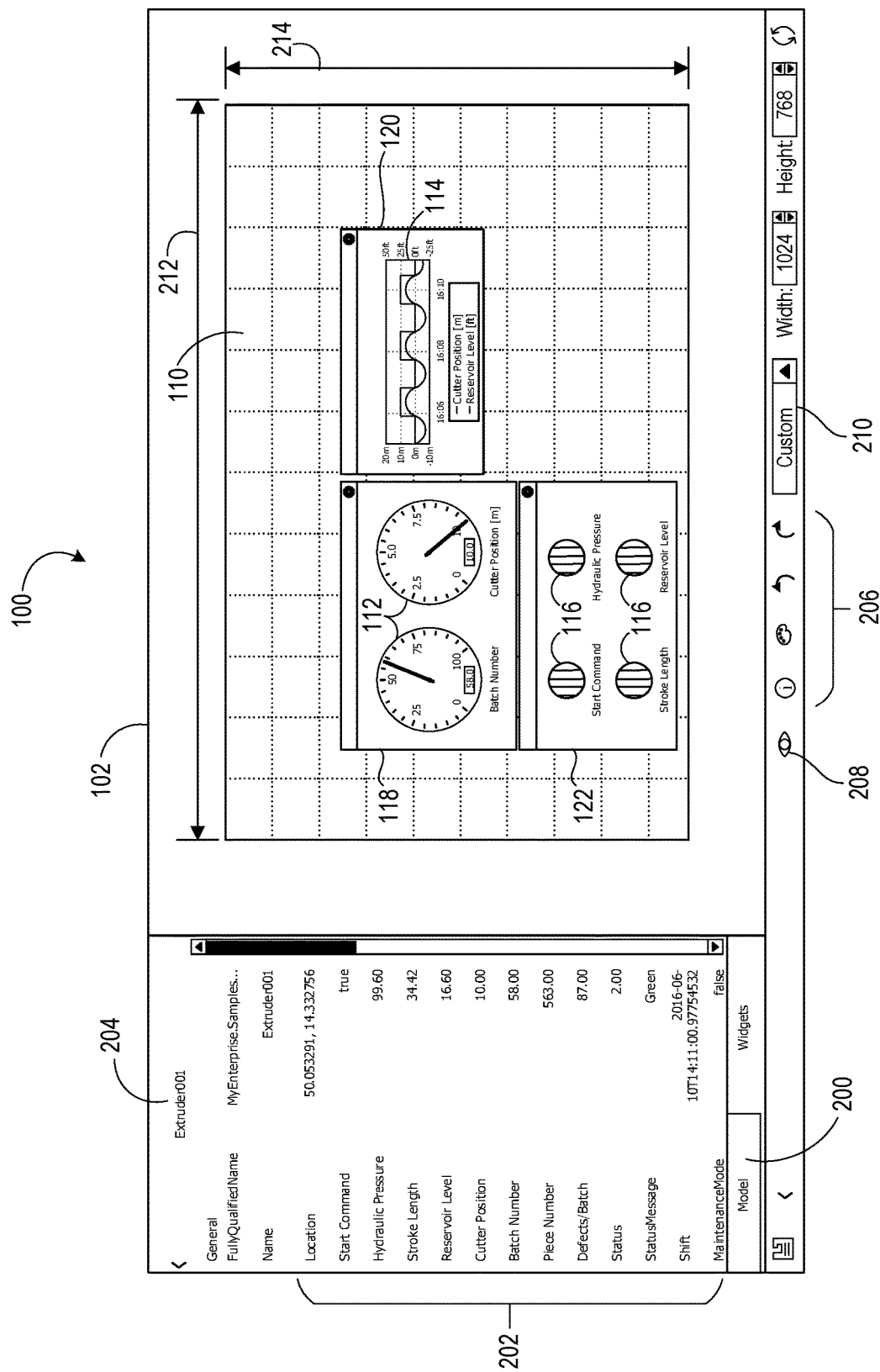
FIG. 7 illustrates a graphical user interface of a dashboard design application in an exemplary implementation.

Via operation of the workspace selector 210, the designer can change the resolution parameters of the workspace 110 in order to design directly in the different resolution parameters. For example, as illustrated in FIG. 7, a custom option may be chosen in workspace selector 210 to allow the designer to specify the height and width parameters of a target viewing device such as a monitor with different dimensions from the default monitor dimensions selected using the "monitor" selection in workspace selector 210. As shown, a dimension for width pixel dimension 212 of 1024 pixels and a dimension for height pixel dimension 214 of 768 pixels have been chosen for workspace 110.

When changed to the new 1024×768 dimensions from the default dimensions shown in FIG. 2, workspace pane 102 automatically re-positions and re-sizes display cells 118-122 and their respective widgets 112-116 using the same rules as the preview tool 208. That is, while the width pixel dimension 212 remains greater than or equal to the monitor threshold, the workspace pane 102 displays the dashboard proportionally to the workspace dimensions.

Figure 8:
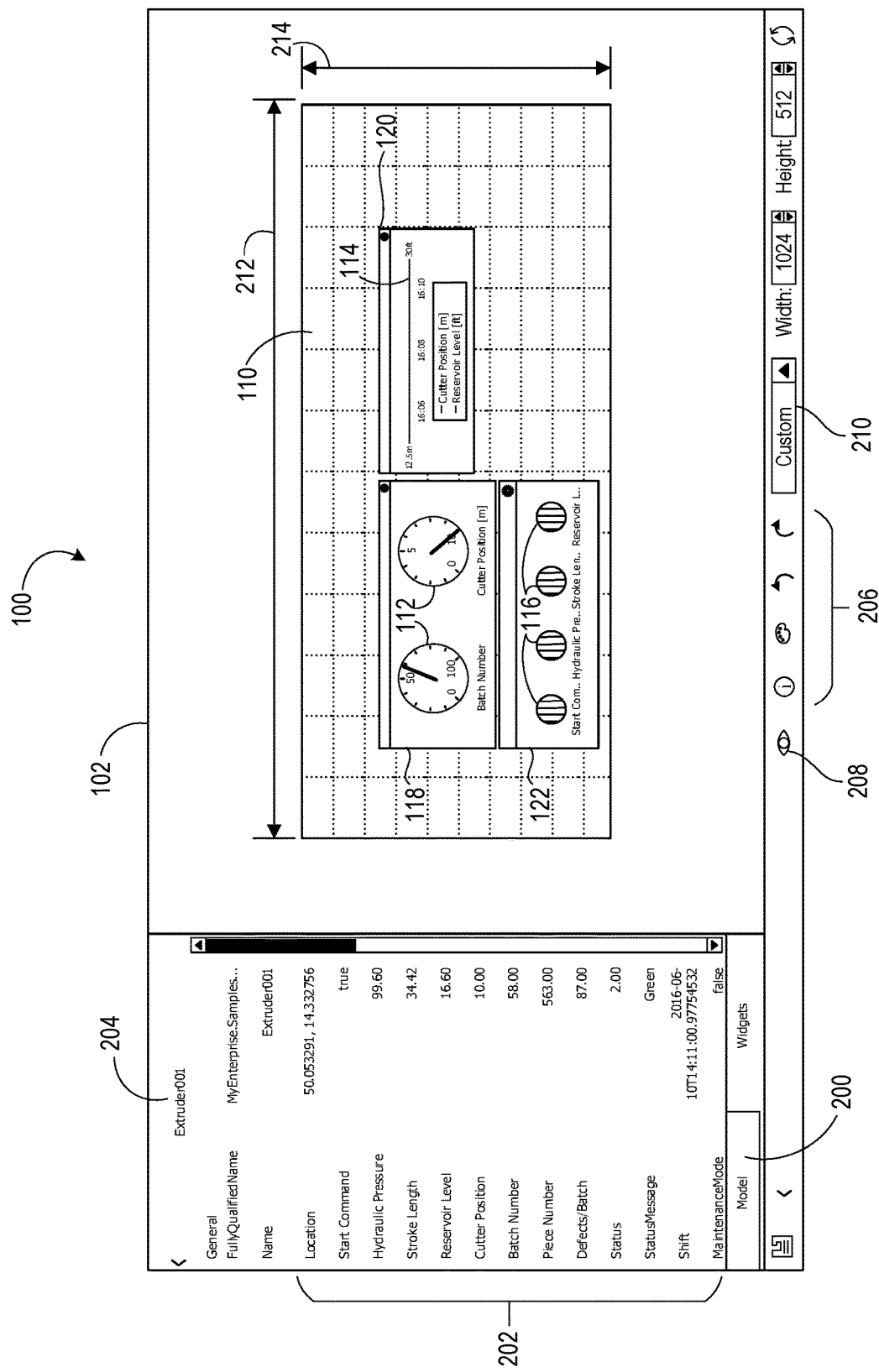
FIG. 8 illustrates a graphical user interface of a dashboard design application in an exemplary implementation.

As can be seen in FIG. 8, a further change in the height pixel dimension 214 from the 1024×768 dimensions of FIG. 7 to a height of 512 pixels automatically re-positions and re-sizes display cells 118-122 and their respective widgets 106 based on the new dimensions. Since the width pixel dimension 212 of 1024 pixels in FIG. 8 is unchanged from the width pixel dimension 212 in FIG. 7, the automatic re-positioning and re-sizing of display cells 118-122 and their respective widgets 112-116 is based on the change in the height pixel dimension 214 only. It is noted that due to the change in the height pixel dimension 214, widgets 112 and 114 show less detail as compared with the detail shown in FIG. 2 in order to re-size display cells 118, 120 to the dimensions of workspace 110 in FIG. 8.

Figure 9:
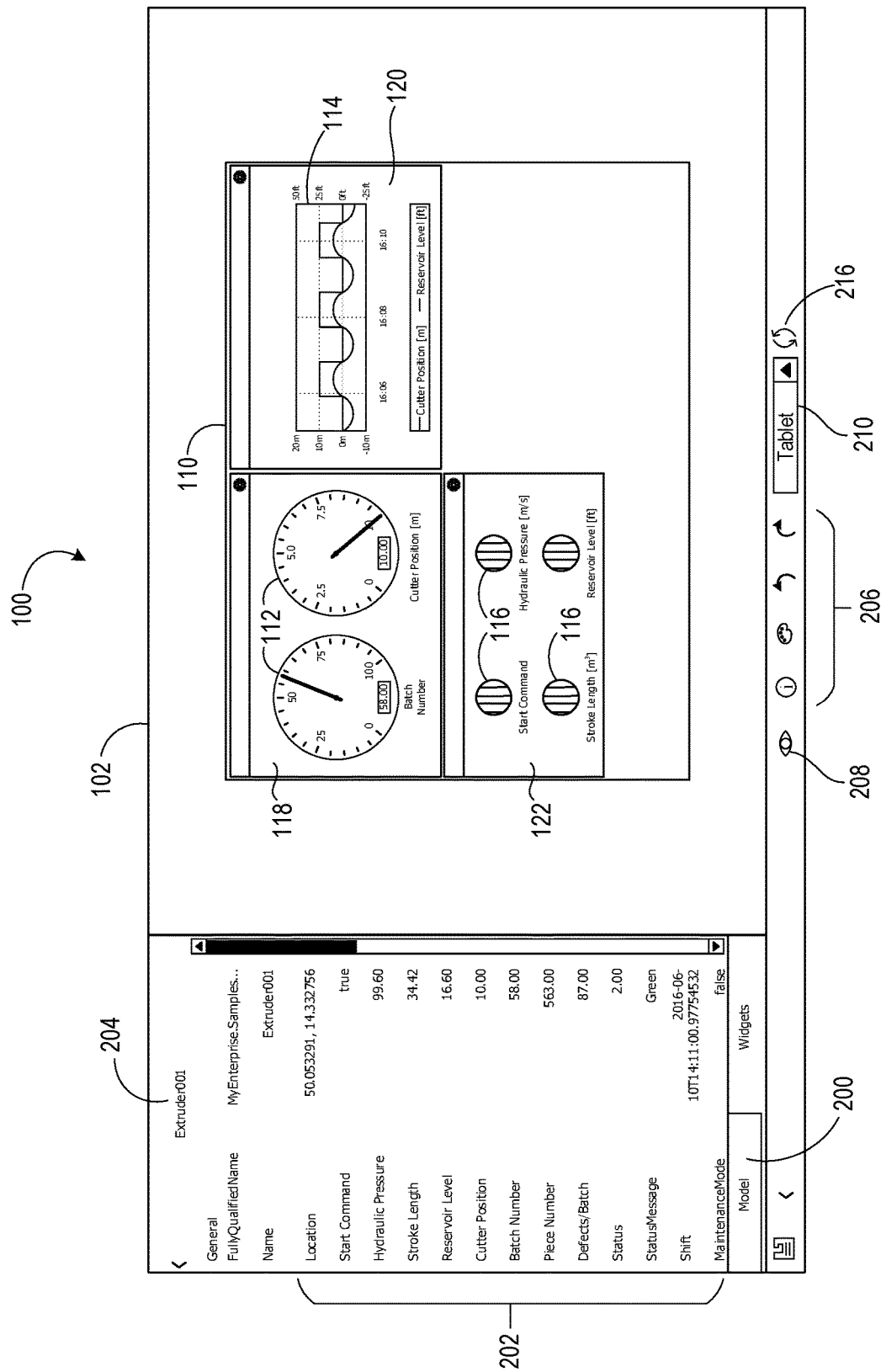
FIG. 9 illustrates a graphical user interface of a dashboard design application in an exemplary implementation.

FIG. 9 illustrates workspace 110 when a tablet mode is chosen in workspace selector 210. Via manipulation of an orientation selector 216, a landscape orientation mode or a portrait orientation mode for workspace 110 may be selected. As illustrated in FIG. 9, the landscape orientation mode for a tablet-sized dashboard and design canvas is shown. In the tablet mode, workspace 110 is configured to display two columns of display cells. However, as discussed in FIG. 11, each display cell may be individually configured to span both columns.

The default view of display cells 118-122 on workspace 110 of FIG. 9 may be determined based on the same rules as the preview tool 208 for the tablet mode. That is, when selecting the tablet mode in the workspace selector 210 from a previous monitor mode, existing display cells 118-122 on workspace 110 may be automatically arranged from the original layout according to a left-to-right/top-to-bottom arrangement or by another type of predetermined arrangement.

Figure 10:
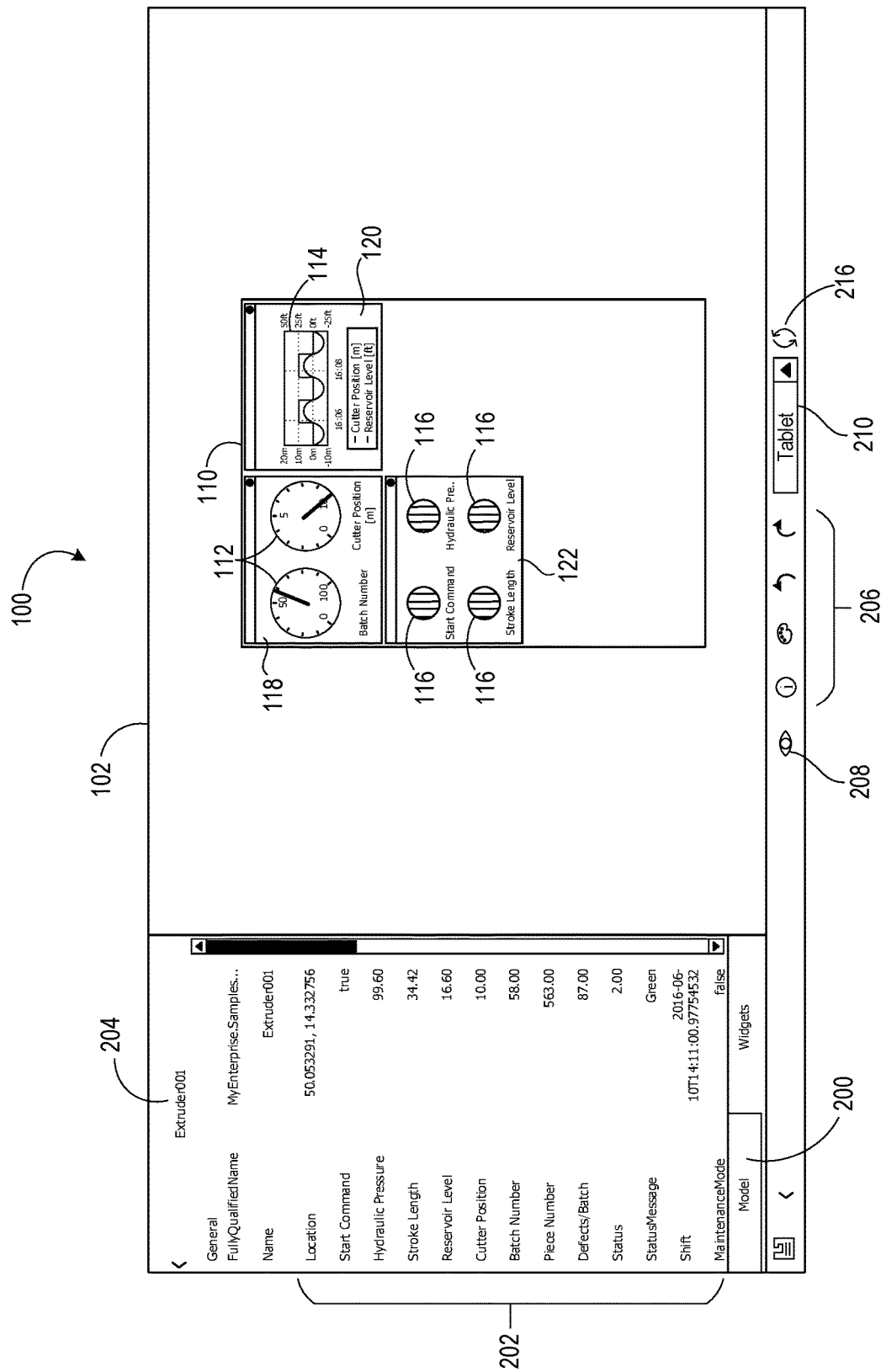
FIG. 10 illustrates a graphical user interface of a dashboard design application in an exemplary implementation.

FIG. 10 illustrates the default view of display cells 118-122 on workspace 110 according to a portrait orientation mode for a tablet-sized workspace 110. Since the two-column arrangement in the landscape orientation mode shown in FIG. 9 allows for wider column widths, the positioning of display cells 118-122 provides a larger display cell in which to show the respective model data in widgets 112-116. Accordingly, widgets 112-116 in a tablet landscape orientation mode may illustrate finer details than widgets 112-116 in a tablet portrait orientation mode.

Figure 11:
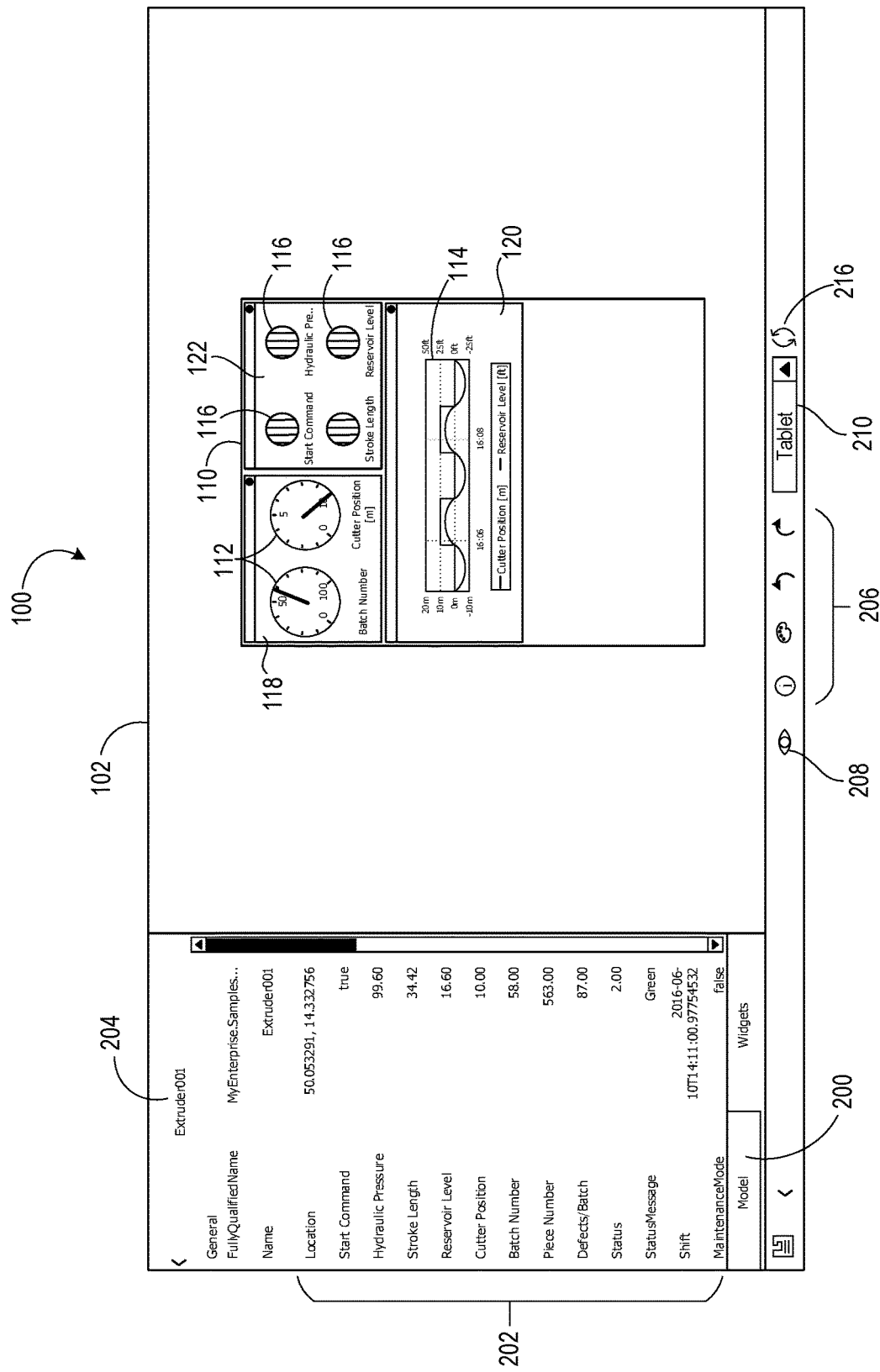
FIG. 11 illustrates a graphical user interface of a dashboard design application in an exemplary implementation.

Designing dashboards directly in the tablet or phone modes allows the designer to change the display of display cells 118-122 from a predetermined default positioning arrangement. That is, while a default view of display cells 118-122 when selecting the tablet mode in the workspace selector 210 from a previous monitor mode may be determined according to a left-to-right/top-to-bottom arrangement, the designer may specify an alternate placement for any of the display cells 118-122 in workspace 110. As illustrated in FIG. 10, a default view may position display cell 118 to the left of display cell 120 and above display cell 122. However, as illustrated in FIG. 11, the designer may change positioning parameters of the display cell 122 to re-position it to be displayed to the right of display cell 118 and may set the viewing parameters of display cell 120 to be displayed across both columns under both display cell 118 and display cell 122. Accordingly, rather than arranging display cells 118-122 according to a default view, workspace 110 or the reporting software may instead position and arrange display cells 118-122 according to the positioning parameters set by the designer for each display cell. The default arrangement of display cells 118-122 on workspace 110 of any of the figures herein may be changed or overridden by the designer as described above.

Figure 12:
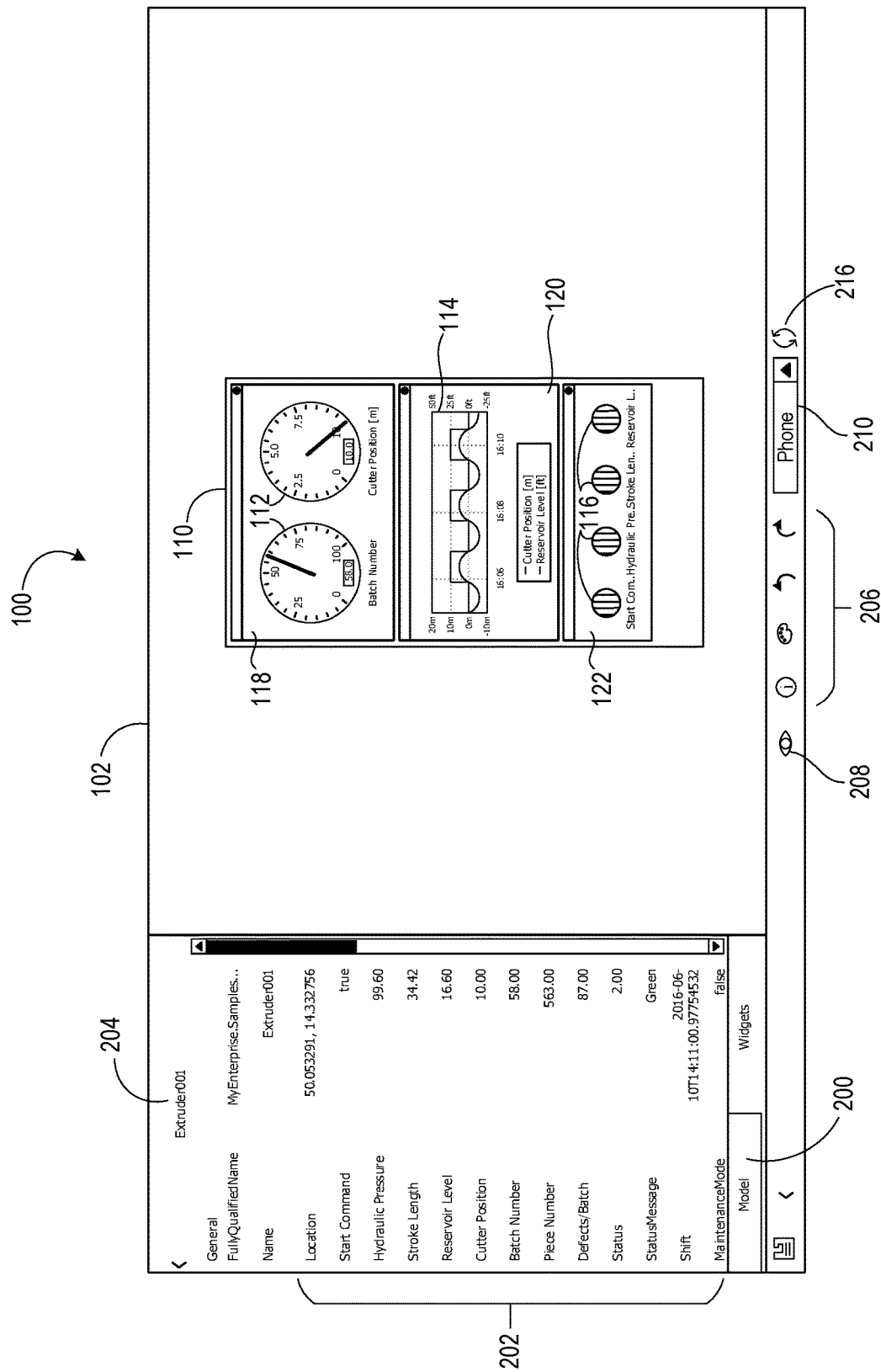
FIG. 12 illustrates a graphical user interface of a dashboard design application in an exemplary implementation.

FIG. 12 illustrates the default view of display cells 118-122 on workspace 110 according to a portrait orientation mode for a phone-sized design canvas or workspace 110. The default view of display cells 118-122 on workspace 110 of FIG. 12 may be determined based on the same rules as the preview tool 208 for the phone mode. That is, when selecting the phone mode in the workspace selector 210 from a previous mode, existing display cells 118-122 on workspace 110 may be automatically arranged from the original layout according to a left-to-right/top-to-bottom arrangement or by another type of predetermined arrangement in a single-column format.

Figure 13:
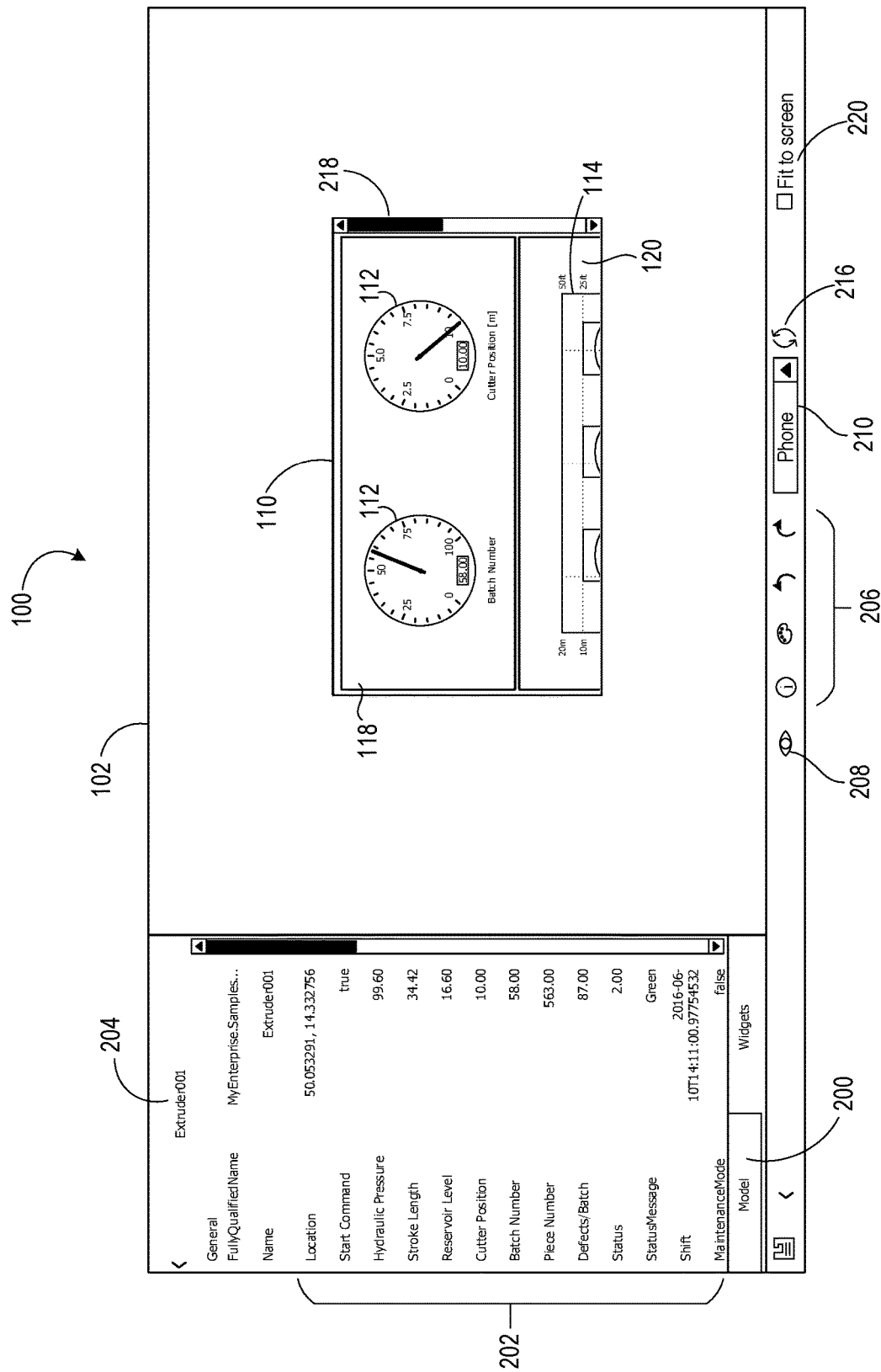
FIG. 13 illustrates a graphical user interface of a dashboard design application in an exemplary implementation.

FIG. 13 illustrates the default view of display cells 118-122 on workspace 110 according to a landscape orientation mode for a phone-sized workspace 110. As illustrated, in one embodiment, when the number and size of display cells 118-122 available on the dashboard exceed the space available on the screen of the viewing device to display them, a vertical scrollbar 218 may be shown to allow the dashboard to be scrolled in order to review all of the display cells 118-122 available for viewing.

In another embodiment, the designer may be presented with a user option 220 to fit the dashboard to the device's screen rather than have the dashboard automatically formatted into a columnar format with scroll bars. If the user selections this option 220, then, when displayed on the mobile device, the dashboard will scaled to fit the resolution dimensions of the phone-sized workspace 110. Accordingly, the dashboard will behave for the phone or tablet devices as if these devices were monitors and display the dashboard according to the rules determined for devices having a resolution greater than or equal to the monitor threshold as described above. User option 220 may be presented to the user in any of the GUIs described herein.

Figure 14:
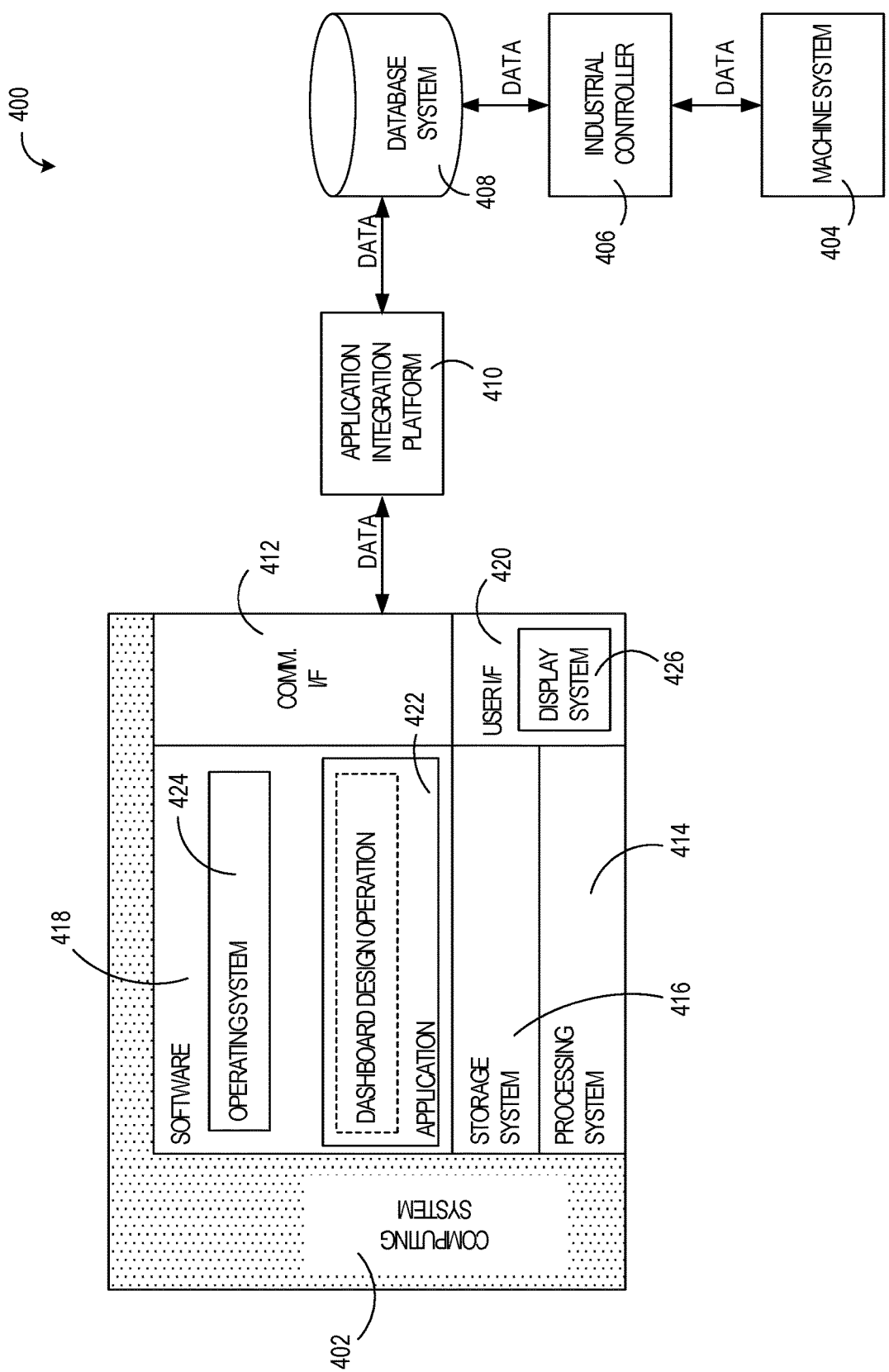
FIG. 14 is a block diagram that illustrates an industrial automation environment in an exemplary implementation.

Turning now to FIG. 14, a block diagram that illustrates an industrial automation environment 400 in an exemplary implementation is shown. Industrial automation environment 400 provides an example of an industrial automation environment that may be utilized to implement a dashboard design and preview system as disclosed herein, but other environments could also be used. Industrial automation environment 400 includes computing system 402, machine system 404, industrial controller 406, database system 408, and application integration platform 410. Machine system 404 and controller 406 are in communication over a communication link, controller 406 and database system 408 communicate over a communication link, database system 408 and application integration platform 410 communicate over a communication link, and application integration platform 410 and computing system 402 are in communication over a communication link. Note that there would typically be many more machine systems in most industrial automation environments, but the number of machine systems shown in FIG. 14 have been restricted for clarity.

Industrial automation environment 400 comprises an automobile manufacturing factory, food processing plant, oil drilling operation, microprocessor fabrication facility, or some other type of industrial enterprise. Machine system 404 could comprise a sensor, drive, pump, filter, drill, motor, robot, fabrication machinery, mill, printer, or any other industrial automation equipment, including their associated control systems. A control system comprises, for example, industrial controller 406, which could include automation controllers, programmable logic controllers (PLCs), programmable automation controllers (PACs), or any other controllers used in automation control of machine system 404. Additionally, machine system 404 could comprise other industrial equipment, such as a brew kettle in a brewery, a reserve of coal or other resources, or any other element that may reside in an industrial automation environment 400.

Machine system 404 continually produces operational data over time. The operational data indicates the current status of machine system 404, such as parameters, pressure, temperature, speed, energy usage, overall equipment effectiveness (OEE), mean time between failure (MTBF), mean time to repair (MTTR), voltage, throughput volumes, times, tank levels, or any other performance status metrics. Machine system 404 and/or controller 406 is capable of transferring the operational data over a communication link to database system 408, application integration platform 410, and computing system 402, typically via a communication network. Database system 408 could comprise a disk, tape, integrated circuit, server, or some other memory device. Database system 408 may reside in a single device or may be distributed among multiple memory devices.

Application integration platform 410 comprises a processing system and a communication transceiver. Application integration platform 410 may also include other components such as a router, server, data storage system, and power supply. Application integration platform 410 provides an example of application server 130, although server 130 could use alterative configurations. Application integration platform 410 may reside in a single device or may be distributed across multiple devices. Application integration platform 410 may be a discrete system or may be integrated within other systems—including other systems within industrial automation environment 400. In some examples, application integration platform 410 could comprise a FactoryTalk® VantagePoint server system provided by Rockwell Automation, Inc.

The communication links over which data is exchanged between machine system 404, industrial controller 406, database system 408, application integration platform 410, and communication interface 412 of computing system 402 could use metal, air, space, optical fiber such as glass or plastic, or some other material as the transport medium—including combinations thereof. The communication links could comprise multiple network elements such as routers, gateways, telecommunication switches, servers, processing systems, or other communication equipment and systems for providing communication and data services. These communication links could use various communication protocols, such as TDM, IP, Ethernet, telephony, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 402 may be representative of any computing apparatus, system, or systems on which the event data saving processes disclosed herein or variations thereof may be suitably implemented. Computing system 402 provides an example of a computing system that could be used as either a server or a client device in some implementations, although such devices could have alternative configurations. Examples of computing system 402 include mobile computing devices, such as cell phones, tablet computers, laptop computers, notebook computers, and gaming devices, as well as any other type of mobile computing devices and any combination or variation thereof. Examples of computing system 402 also include desktop computers, server computers, and virtual machines, as well as any other type of computing system, variation, or combination thereof. In some implementations, computing system 402 could comprise a mobile device capable of operating in a server-like fashion which, among other uses, could be utilized in a wireless mesh network.

Computing system 402 includes processing system 414, storage system 416, software 418, communication interface 412, and user interface 420. Processing system 414 is operatively coupled with storage system 416, communication interface 412, and user interface 420. Processing system 414 loads and executes software 418 from storage system 416. Software 418 includes application 422 and operating system 424. Application 422 may include the dashboard design and preview operations described herein in some examples. When executed by computing system 402 in general, and processing system 414 in particular, software 418 directs computing system 402 to operate as described herein or variations thereof. In this example, user interface 420 includes display system 426, which itself may be part of a touch screen that also accepts user inputs via touches on its surface. Computing system 402 may optionally include additional devices, features, or functionality not discussed here for purposes of brevity.

Storage system 416 may comprise any storage media readable by processing system 414 and capable of storing software. Storage system 416 may include volatile and nonvolatile, removable and non-removable media implemented in any method or technology for storage of information, such as computer readable instructions, data structures, program modules, or other data. Storage system 416 may be implemented as a single storage device but may also be implemented across multiple storage devices or subsystems. Storage system 416 may comprise additional elements, such as a controller, capable of communicating with processing system 414. Examples of storage media include random access memory, read only memory, and flash memory, as well as any combination or variation thereof, or any other type of storage media. In some implementations, the storage media may be a non-transitory storage media. In some implementations, at least a portion of the storage media may be transitory. It should be understood that in no case is the storage media a propagated signal.

Software stored on or in storage system 416 may comprise computer program instructions, firmware, or some other form of machine-readable processing instructions having processes that when executed by processing system 414 direct the processing system 414 to operate as described herein.

The software may also include user software applications. The software may be implemented as a single application or as multiple applications. In general, the software may, when loaded into processing system 414 and executed, transform processing system 414 from a general-purpose device into a special-purpose device customized as described herein.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method for previewing a dashboard report comprising:
    enabling display, by a system comprising a processor, of a display cell comprising a first graphical object configured to present data from an industrial automation system, wherein the display cell is positionable about a dashboard design canvas of a design graphical user interface (GUI);

subsequent to placing to the display cell a first template tag representing a first property of a model, automatically tying, by the system, the data to a property of the first graphical object:

subsequent to placing to the display cell a second template tag representing a second property of the model:
  enabling display, by the system and in the display cell, of a second graphical object; and
  automatically tying, by the system, the data to a property of the second graphical object; and in response to receiving an input to display a preview GUI of the dashboard design canvas, enabling display, by the system, on the preview GUI, and according to a preview mode, of a preview of the dashboard design canvas comprising the display cell, wherein the preview mode is selectable from a plurality of preview modes comprising a monitor device preview mode and an alternate device preview mode;

wherein the monitor device preview mode causes the preview GUI to enable display of the preview of the dashboard design canvas as the dashboard design canvas would appear when viewed on a monitor device having a screen resolution greater than a monitor threshold; and wherein the alternate device preview mode causes the preview GUI to enable display of the preview of the dashboard design canvas as the dashboard design canvas would appear when viewed on a preview device having a screen resolution less than the monitor threshold.

2. The method of claim 1 wherein the monitor device preview mode causes the preview GUI to enable display of the preview of the dashboard design canvas comprising the display cell in a location proportional to a relationship of a size of the display cell to a size of the dashboard design canvas.

3. The method of claim 1 wherein the alternate device preview mode causes the preview GUI to enable display of the preview of the dashboard design canvas as the dashboard design canvas would appear when viewed on a tablet device having a screen resolution less than the monitor threshold and greater than a tablet threshold.

4. The method of claim 3 wherein the alternate device preview mode causes the preview GUI to enable display of the display cell on the preview of the dashboard design in a columnar arrangement according to a predetermined arrangement other than a left-to-right/top-to-bottom arrangement.

5. The method of claim 4 wherein the columnar arrangement comprises two columns, and wherein a width of the display cell increases from a width of one column to a combined width of the two columns.

6. The method of claim 3 wherein the preview mode comprises a phone device preview mode that, when implemented, causes the preview GUI to enable display of the preview of the dashboard design canvas as the dashboard design canvas would appear when viewed on a phone device having a screen resolution less than the tablet threshold.

7. The method of claim 6 wherein the phone device preview mode causes the preview GUI to enable display of the display cell on the preview of the dashboard design canvas in a columnar arrangement independent of a relationship of a size of the display cell to a size of the dashboard design canvas.

8. The method of claim 1 further comprising:
in response to an input to place the first graphical object on the dashboard design canvas:
generating, by the system, the display cell having a widget type; and
enabling display, by the system and in the display cell, of the first graphical object according to the widget type.

9. The method of claim 8 further comprising:
subsequent to placing to the display cell the second template tag, automatically resizing, by the system, the display cell to enable display of at least the first graphical object and the second graphical object.

10. A non-transitory computer-readable medium having stored thereon instructions that, in response to execution, cause a system comprising a processor to perform operations, the operations comprising:
  enabling display of a display cell comprising a first graphical object configured to present data from an industrial automation system, wherein the display cell is positionable about a dashboard design canvas of a design graphical user interface (GUI);
  subsequent to placing to the display cell a first template tag representing a first property of a model, automatically tying the data to a property of the first graphical object;
  subsequent to placing to the display cell a second template tag representing a first property of a model:
    enabling display, in the display cell, of a second graphical object; and
    automatically tying the data to a property of the second graphical object; and
  in response to receiving an input to display a preview GUI of the dashboard design canvas, enabling display, on the preview GUI and according to a preview mode, of a preview of the dashboard design canvas comprising the display cell, wherein the preview mode is selectable from a plurality of preview modes comprising a monitor device preview mode and a handheld device preview mode;
  wherein the monitor device preview mode causes the preview GUI to enable display of the preview of the dashboard design canvas as the dashboard design canvas would appear when viewed on a monitor device having a screen resolution greater than a monitor threshold; and
  wherein the handheld device preview mode causes the preview GUI to enable display of the preview of the dashboard design canvas as the dashboard design canvas would appear when viewed on a handheld preview device having a screen resolution less than the monitor threshold.

11. The non-transitory computer-readable medium of claim 10 wherein the monitor device preview mode causes the preview GUI to enable display of the preview of the dashboard design canvas comprising the display cell in a location proportional to a relationship of a size of the display cell to a size of the dashboard design canvas.

12. The non-transitory computer-readable medium of claim 10 wherein the handheld device preview mode causes the preview GUI to enable display of the preview of the dashboard design canvas as the dashboard design canvas would appear when viewed on a handheld device in a columnar arrangement independent of a relationship of a size of the display cell to a size of the dashboard design canvas.

13. The non-transitory computer-readable medium of claim 12 wherein the handheld device comprises a tablet device; and
  wherein the columnar arrangement comprises a two-column arrangement.

14. The non-transitory computer-readable medium of claim 13 wherein the handheld device preview mode causes the preview GUI to display the preview of the dashboard design canvas as the dashboard design canvas would appear when viewed on the tablet device having a screen resolution less than the monitor threshold and greater than a tablet threshold.

15. The non-transitory computer-readable medium of claim 12 wherein the handheld device comprises a phone device; and
    wherein the columnar arrangement comprises a one-column arrangement.

16. The non-transitory computer-readable medium of claim 15 wherein the handheld device preview mode causes the preview GUI to display the preview of the dashboard design canvas as the dashboard design canvas would appear when viewed on the phone device having a screen resolution less than the monitor threshold and less than a tablet threshold, wherein the tablet threshold is less than the monitor threshold.

17. A system for previewing a dashboard report comprising:
    a memory that stores executable components; and
    a processor, operatively coupled to the memory, that executes the executable components, the executable components comprising:
    a display component for enabling display of a display cell comprising a first graphical object configured to present data from an industrial automation system, wherein the display cell is positionable about a dashboard design canvas of a design graphical user interface (GUI); and
    a visual manager, operatively coupled to the display component, configured to:
    subsequent to placing to the display cell a first template tag representing a first property of a model, automatically tie the data to a property of the first graphical object;
    subsequent to placing to the display cell a second template tag representing a second property of the model:
      enable display, in the display cell, of a second graphical object; and
      automatically tie the data to a property of the second graphical object;
    in response to receiving an input to display a preview GUI of the dashboard design canvas, enabling display, on the preview GUI and according to a preview mode, of a preview of the dashboard design canvas comprising the display cell, wherein the preview mode is selectable from a plurality of preview modes comprising a monitor device preview mode, a tablet device preview mode, and a phone device preview mode;
    wherein the monitor device preview mode causes the preview GUI to enable display of the preview of the dashboard design canvas as the dashboard design canvas would appear when viewed on a monitor device having a screen resolution greater than a monitor threshold;
    wherein the tablet device preview mode causes the preview GUI to enable display of the preview of the dashboard design canvas as the dashboard design canvas would appear when viewed on a tablet device having a screen resolution less than the monitor threshold and greater than a tablet threshold; and
    wherein the phone device preview mode causes the preview GUI to enable display of the preview of the dashboard design canvas as the dashboard design canvas would appear when viewed on a phone device having a screen resolution less than the tablet threshold.

18. The system of claim 17 wherein the monitor device preview mode causes the preview GUI to enable display of the display cell on the preview of the dashboard design canvas in a location proportional to a relationship of a size of the display cell to a size of the dashboard design canvas and in an orientation according to an orientation control.

19. The system of claim 17 wherein the tablet device preview mode causes the preview GUI to display the preview of the dashboard design canvas as the dashboard design canvas would appear when viewed on the tablet device in a bi-column arrangement independent of a relationship of a size of the display cell to a size of the dashboard design canvas.

20. The system of claim 17 wherein the phone device preview mode causes the preview GUI to display the preview of the dashboard design canvas as the dashboard design canvas would appear when viewed on the phone device in a uni-column arrangement independent of a relationship of a size of the display cell to a size of the dashboard design canvas.

* * * * *